Feb. 25, 1964     J. C. WHITTINGHAM     3,122,339
INERTIA REEL MECHANISM

Filed Jan. 25, 1963     3 Sheets-Sheet 1

INVENTOR.
JOHN C. WHITTINGHAM
BY
Anderson, Spangler & Wymore
ATTORNEYS

Feb. 25, 1964 J. C. WHITTINGHAM 3,122,339
INERTIA REEL MECHANISM
Filed Jan. 25, 1963 3 Sheets-Sheet 2

INVENTOR.
JOHN C. WHITTINGHAM
BY
Anderson, Spangler & Wymore
ATTORNEYS

Feb. 25, 1964

J. C. WHITTINGHAM 3,122,339

INERTIA REEL MECHANISM

Filed Jan. 25, 1963

INVENTOR.
JOHN C. WHITTINGHAM
BY
Anderson, Spangler & Wymore
ATTORNEYS

United States Patent Office 3,122,339
Patented Feb. 25, 1964

3,122,339
INERTIA REEL MECHANISM
John C. Whittingham, Colorado Springs, Colo., assignor to Aircraft Mechanics, Inc., Colorado Springs, Colo., a corporation of Colorado
Filed Jan. 25, 1963, Ser. No. 253,967
16 Claims. (Cl. 242—107.4)

The present invention relates generally to safety harnesses and appliances therefor for use by personnel in moving vehicles. More specifically, the present invention provides a new and novel apparatus for controlling the movements and excursions of personnel wearing safety harness by maintaining them in seated or reclining position during certain conditions of acceleration or deceleration. This application is a continuation-in-part of my application Serial Number 141,705 filed September 29, 1961, entitled "Inertia Reel Mechanism."

It is the primary object of the present invention to provide a device to which is attached one end of a safety belt, such as a lap belt or shoulder harness, which permits free and relatively unrestricted movement, within a given range, of the personnel wearing the safety belt, but which will sharply restrict such movement under given condition of acceleration or deceleration.

A second object of the invention is to provide a belt drum and associated apparatus which permits a belt wound on the drum to be payed out under conditions of relatively constant tension, but which will prohibit unwinding of the belt if the belt pay out undergoes a given acceleration.

A further object of the invention is to restrict any unwinding of the belt from its drum mounting during or after a predetermined shock load on the apparatus, which shock load is along the longitudinal axis of the vehicle.

A still further object of the invention is to provide safety apparatus having means to lock personnel safety harness against further outward excursions under certain conditions of loading, but at the same time, permit a taking in or withdrawal of the safety harness.

Another and still further object of the invention is to simplify and make a more efficient inertia reel mechanism.

Other and still further objects, features, and advantages of the invention will become apparent by a reading of the detailed description of the preferred embodiment of the invention taken in conjunction with the following drawing in which.

*General*

Figure 1:
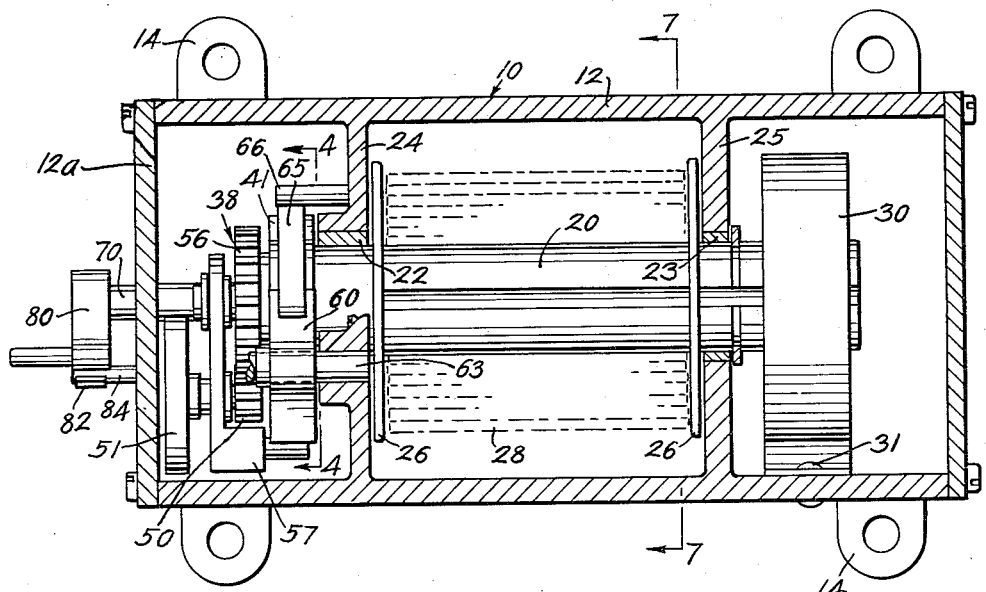
FIGURE 1 is a front elevation of the inertia reel structure with portions of the housing broken away and shown in section.

Generally, the apparatus of the present invention which is indicated by the numeral 10 comprises a three compartment substantially enclosed housing 12, which is adapted for mounting on any stationary structural member near to or on a seat by fastener means inserted through holes in the four mounting ears 14, which protrude from a flat side 12b of the housing 12 which is mounted in an abutting relation to the seat or other convenient mounting member.

The central compartment of the housing contains a cylindrical drum 20 journaled for rotation in a pair of sleeve bearings 22 and 23 which are carried by two partitions 24 and 25 respectively, which partitions are integral with the housing 12 and serve to vertically divide the interior of the housing into the said three compartments. On the drum 20 between a spaced apart pair of annular drum flanges 26 is wound a web belt 28 of the type used for safety belts in aircraft seats. The web belt 28 is securely attached to the drum 20 at one of its ends and the other end of the belt protrudes through an appropriate opening 12c in the flat or forward side 12b of the housing 12 and has attached thereto a fastener 29 which may be attached to the free ends of other safety belts, such as a pair of shoulder harnesses used by an aircraft pilot.

Figure 7:
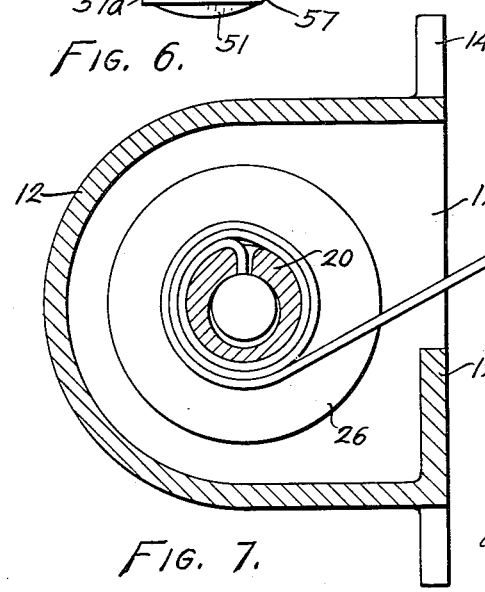
FIGURE 7 is a cross-sectional view taken along line 7—7 in FIGURE 1, with the forward side of the structure at the right.

Looking at FIGURE 1 of the drawings, the right hand compartment of the housing 12 is seen to contain a spirally wound power spring 30 whose inner end is secured to an axial extension of the drum 20. The outside end of the power spring 30 is attached to the housing 12, as by a screw 31. The spring 30 is arranged with respect to the drum 20 so that as the drum is rotated counter-clockwise (referring to FIGURE 7) and the belt 28 is reeled off of the drum, the power spring 30 is wound up; that is, the spring energy is increased. When the restraining force is removed from the belt, the spring acts to rotate the drum 20 in a clockwise direction and thus re-wind the belt onto the drum. The power spring 30 is a constant tension type spiral-like spring, such as the Spirator spring manufactured by the Hunter Spring Company of Landsdale, Pennsylvania, which maintains a nearly constant tension force on the belt 28 as it is payed out from its reeled position on the drum 20. Disposed in the left hand compartment of the housing 12 is the inertia reel mechanism 38 which, in combination with the aforementioned structure comprises the fundamental portion of the apparatus of the present invention, all of which will be explained in detail as the specification progresses. Basically, the mechanism includes a ratchet wheel 41 secured to and rotatable with an extension of the web belt-carrying drum 20; the inertia mechanism, the parts of which are referred to by reference numerals in the fifties; the automatic locking pawl 60 and its associated parts, referred to by reference numbers in the sixties; and the manual locking dog 71, with its associated parts, identified by reference numbers in the seventies.

Figure 2:
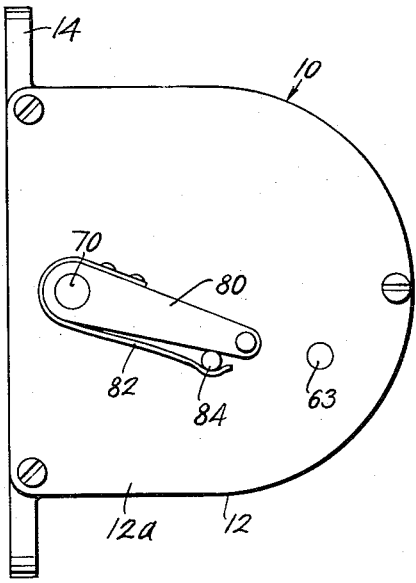
FIGURE 2 is a side elevation of the structure.

Extending through the side of the housing 12 which covers the left hand compartment is an extended portion of the spindle 70 which rotatably mounts the manual locking dog 71. Secured to the extended spindle 70 is a biased handle 80 adapted for manual rotation, either directly or indirectly through a cable connection or the like. The handle 80 is urged toward its position as shown in FIGURE 2 by a curved leaf spring 82 which is fastened to the handle 80 near its center of rotation and abutted to a pin 84 which projects laterally from the side 12a of the housing and acts as a clockwise stop for the handle 80. It is to be understood that the handle arrangement shown and described is primarily for illustrative purposes only. In actual use the handle 80 would be operated by a flexible connector, the control and lock for which would be disposed at a remote position convenient to the pilot or other person using the locking device.

*Inertia Reel Mechanism*

Figure 4:
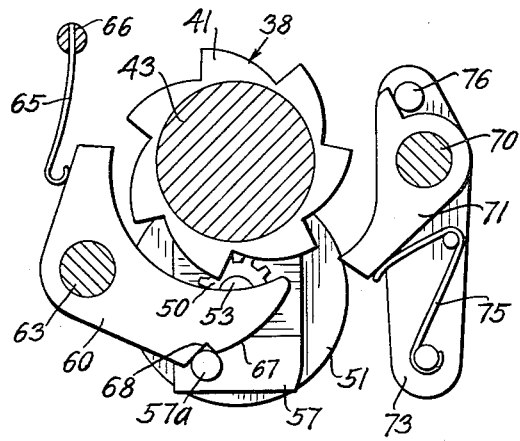
FIGURE 4 is a cross sectional view taken along line 4—4 of FIGURE 1.
Figure 5:
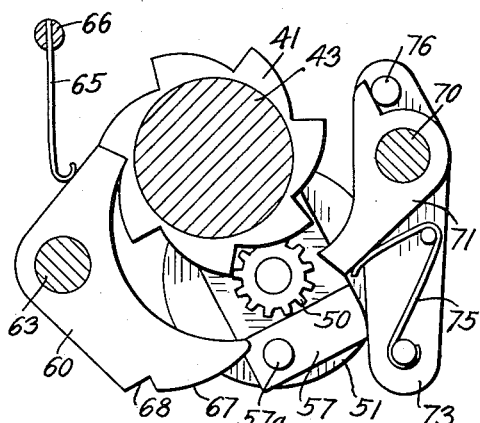
FIGURE 5 is taken similarly to FIGURE 4 and illustrates the automatic locking pawl in locking position.
Figure 6:
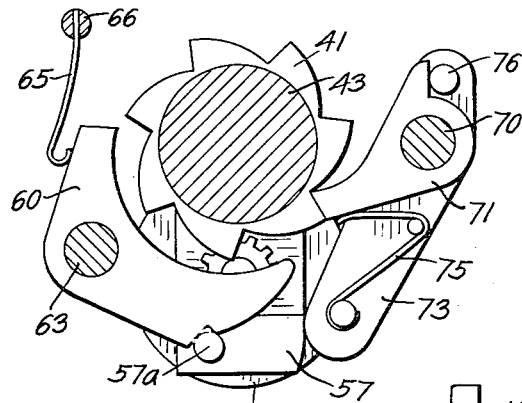
FIGURE 6 is taken similarly to FIGURES 4 and 5 but illustrates the actuation of the manual locking apparatus.

As will be evident from the foregoing list of the objects for the present invention, the primary and fundamental function of the inertia mechanism is to lock the drum 20, under certain conditions, so as to prevent further paying out of the web belt 28, but at the same time to permit the rotation of the drum 20 that will reel or wind-up the belt 28 to the extent permitted by the person wearing the safety harness. This dual function is made possible through the utilization of a ratchet wheel 41 secured to a first axial extension 43 of the drum 20 and rotatable therewith. As seen in FIGURES 4, 5 and 6, the ratchet wheel is shaped and arranged to permit clockwise (unwinding) rotation of the drum 20 even though a pawl 60 or dog 71 may be in contact with the ratchet wheel at one of its interdental spaces, thus preventing counter-clockwise rotation of the drum. (See FIGURES 5 and 6.)

The two locking devices just mentioned, the pawl 60 and the dog 71, which prevent counter-clockwise rotation of the ratchet wheel 41, are independently operable and serve respectively to automatically and manually lock the drum 20 against unwinding rotation.

Referring first to the automatic locking feature of the mechanism, it is to be noted that the automatic locking pawl 60 may be urged by the biasing leaf spring 65 into locking engagement with the drum-mounted ratchet wheel 41 by two separate conditions. The first of these is the appearance of a predetermined amount of rotational acceleration in the drum 20. The second is the application of a shock or the sudden presence of excessive G-forces approximately along the longitudinal axis of the vehicle, such as would violently throw a seated person forward if the vehicle were to decelerate rapidly. The amount of G-forces necessary to trigger the automatic locking pawl 60 into engagement with the ratchet wheel 41 is a matter of choice and of design criteria in the parts of the machine.

The locking pawl 60 is pivotally mounted on a shaft 63 which laterally transverse the left hand compartment of the housing 12 and is supported by aligned bearing holes in the end 12a of the housing and the left hand vertical partition 24 of the housing 12. Referring to FIGURE 4, the said pawl 63 is biased for clockwise rotation about its pivot point 63 by a leaf spring 65 which bears against the upper end of the pawl 60. The biasing spring 65 is fastened at one end in a diametric slot in a rotatable support pin 66 which may be threaded and inserted in a mating hole in the housing partition 24. Thus by slight rotational adjustment of the pin 66 the biasing force of the spring 65 may be increased or decreased. Along the bottom camming edge 67 of the pawl 60 is provided a shallow detent 68 into which falls a holding pin 57a which projects longitudinally from the bottom ledge of a hanger bracket 57 which is mounted on and hangs from a second reduced diameter extension 52 of the drum 20. Characteristic of a pendulum, the hanger bracket is hung from drum extension 52 and is rotatable with respect to the drum extension.

Figure 3:
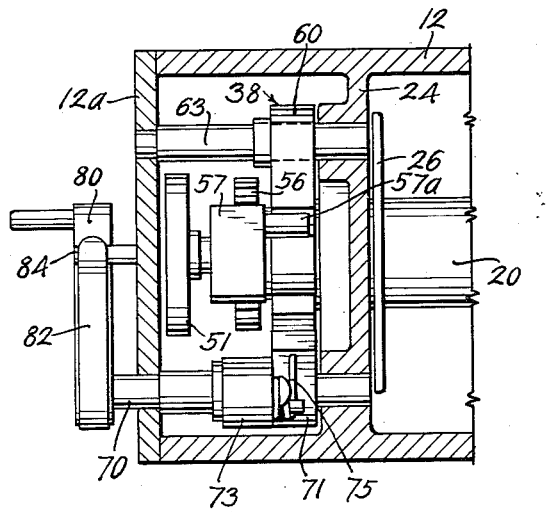
FIGURE 3 is a fragmentary plan view of the bottom of the inertia reel mechanism with portions of the housing broken away and shown in section. Portions of the structure are omitted to conserve space.

As will be explained later, if the holding pin 57a is removed, by one force or another, from the pawl detent 68, the spring 65 forces the pawl 60 to pivot clockwise (FIGURE 5) and engage the teeth and interdental spaces of the drum-mounted ratchet wheel 41. The locking pawl 60 may be removed from its engagement with the ratchet wheel 41 by clockwise rotation of the release finger 73 which is also mounted on the rotatable handle mounting spindle 70. As seen best in FIGURE 3, the release finger 73, is co-planar with the pendulum-like hanger bracket 57 and as the bracket 57 is contacted by the clockwise rotation of the release finger 73 (FIGURE 5) the holding pin 57a abuts the lower edge 67 of the automatic locking pawl 60 and cams the pawl 60 into a rotated position, forcing the pawl 60 out of engagement with the ratchet wheel 41 and permitting the holding pin 57a to seat itself in the pawl detent 68 (FIGURE 6).

As will be apparent from the drawings, and FIGURE 6 in particular, the clockwise rotation of the handle mounting spindle 70 moves not only the release finger 73, but also the manual locking dog 71, which engages the teeth of the ratchet wheel 41 and prevents counter-lockwise rotation of the ratchet wheel and drum 20. As long as the spindle 70 which carries the locking dog 71 remains in the rotated position, as shown in FIGURE 6, the drum 20 will remain locked against unwinding rotation. When the dog 71 is rotated counter-clockwise, the ratchet wheel is free to rotate in either direction. To permit clockwise rotation of the drum 20 while the drum is manually locked, a spring 75 is mounted on the surface of the release finger 73 and arranged to bias the locking dog 71 for clockwise rotation about the spindle 70. Rotation of the dog beyond the extremities of the spring 75 is prevented by a stop pin 76 which engages one end of the dog 71. Clockwise movement of the ratchet wheel (winding rotation of the drum) can thus be maintained under manual lock conditions while keeping the locking dog 71 firmly seated in the interdental spaces of the ratchet wheel as it rotates in the one direction.

The mechanism for maintaining the manual locked condition does not form part of the present invention. As shown in the drawings, the handle 80 must be manually held in the lock position to hold the locking dog 71 in place. However, many well known holding devices may be used which mechanically secure the manual locked condition, the most obvious being a handle and lock therefor which would attach to the other end of the flexible cable which operates the handle 80.

Having thus described the mechanisms which automatically and manually lock the drum 20 against unwinding rotation and release it, there remains to be described the automatic inertia mechanisms responsible for dislodging the holding pin 57a from its detent 68 in the locking pawl 60.

Figure 8:
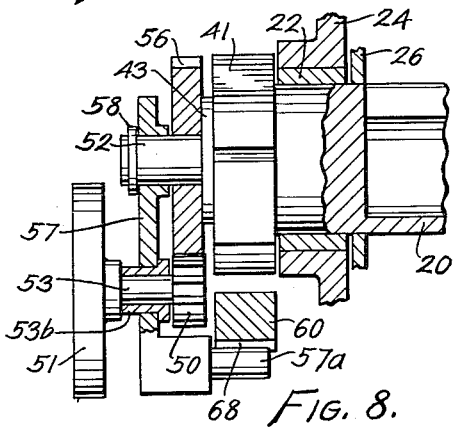
FIGURE 8 is a fragmentary elevational view of the mechanism which, by partial cross sectional views and omission of certain parts, emphasizes the detail of the inertia mechanism.

Attention is directed to FIGURE 8 which primarily illustrates the inertia mechanism. Mounted for rotation on the second reduced diameter extension 52 of the drum 20 is a first spur gear 56 of approximately the same diameter as the ratchet wheel 41. Also mounted on the same extension 52 of the drum 20 is the previously referred to pendulum-like hanger bracket 57, which it is to be noted, is fitted onto the shaft 52 with such great dimensional tolerance as to be only supported by the shaft 52 and not to rotate with it. The hanger bracket 57 is maintained in its position on the shaft 52 by a press-fit washer 58 which engages the end of the shaft 52 and prevents the hanger bracket 57 from moving off of the end of the shaft.

Into a central opening in the hanger bracket 57, below the level of the periphery of the first spur gear 56, is disposed a bearing sleeve 53b. The sleeve is snugly fit into the opening and provides a firm, sturdy bearing for the journal of a shaft 53 which carries an inertia wheel 51 on one of its ends and a second small diameter spur gear 50 on its other end. The second spur gear 50 meshes with the teeth of the first spur gear 56 so that rotation of the first spur gear 56 tends to cause rotation of the second spur gear 50.

*Operation*

During normal operation of the device, that is when the drum 20 is rotated at a nominal speed in paying off the web belt 28, the second spur gear 50 and its inertia flywheel 51 also rotate by virtue of the engagement with the first gear 56. However, if the inertia of the wheel 51 is great enough to momentarily resist a certain degree of rotational acceleration of the second spur gear 50 as it is attempted to be rotated by the first spur gear 56, the second spur gear 50 tends to ride counter-clockwise around the periphery of the first spur gear in the direction of its rotation. Indeed, this is made possible by the pendulum mounting of the hanger bracket 57. As the bracket 57 is thus rotated about its center of rotation, the holding pin 57a is dislodged from its detent 68 in the automatic locking pawl 60 and the pawl is forced into locking engagement with the ratchet wheel 41 as previously explained.

As thus far described, the inertia reel mechanism of the present invention possesses automatic multi-directional locking capability; that is to say, no matter what direction the web belt 28 is pulled from the drum, the locking mechanism will operate if certain predetermined drum rotational acceleration is present. The multi-directional capability of the mechanism is not dependent on the mounted position of the structure as is a solely unidirectional unit which operates only as a function of longitudinal forces of deceleration acting on the unit. The novel structure of the present invention, however, incorporates the features of a unidirectional unit if the unit is mounted and positioned so that a plane passing through the axis of pivotal rotation of the hanger bracket 57 is normal to the longitudinal axis of the vehicle and the right hand side of the mechanism (referring to FIGURE 4) is forward. By reference to FIGURE 4, it is seen that if the right hand side of the figure was representative of the forward direction of an aircraft in which the device was mounted, that a sudden deceleration in the direction of forward travel would tend to swing the mass (formed by the hanger bracket 57, gear 50 and inertia flywheel 51) counter-clockwise about its center of rotation thus unseating the holding pin and allowing the automatic locking pawl 60 to engage the ratchet wheel 41.

It has been found that a relatively rapid take-up of the belt by the drum 20, accompanied by a sudden stoppage of the belt take-up will cause the triggering of the automatic locking pawl 60. This is due to the inertia possessed by the rotating inertia flywheel 51 and its associated second spur gear 50 which will not allow the flywheel to stop rotating as quickly as the drum 20. When the drum 20 suddenly ceases a clockwise rotation (FIGURE 4), the tendency is for the second spur gear 50 to continue its counter-clockwise rotation and to crawl counter-clockwise around the periphery of the first spur gear 56, thus unseating the holding pin 57a, as previously explained.

Figure 9:
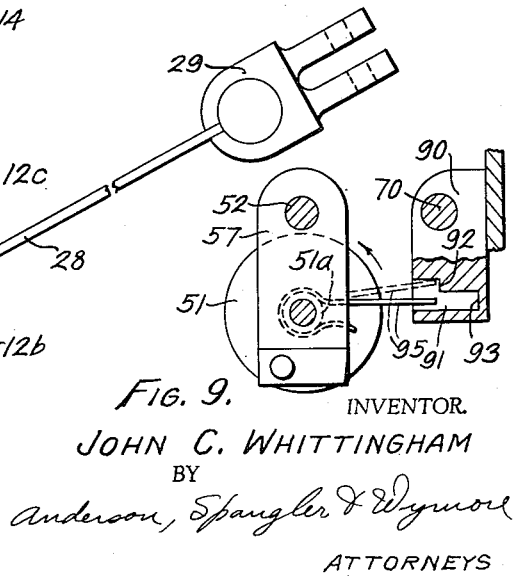
FIGURE 9 is a fragmentary elevation illustrating the anti-locking modification which may be added to the structure.

In cases where this form of automatic locking is deemed undesirable, an anti-locking device, as illustrated in FIGURE 9, can be added to the already existing structure. A spring clip wire 95 forming an elongated pin is clamped to the hub flange 51a of the inertia flywheel 51, and one end of the wire is made to extend laterally into a double ended cavity 91 in a block 90 which is fixedly mounted on spindle 70 in alignment with and in the same plane as the flanged hub 51a of the flywheel 51. The cavity 91 is formed with two vertical ends 92 and 93, one of the ends 93 being deeper in the cavity than the other end 92. As the flywheel 51 turns in response to paying off rotation of the drum (clockwise in FIGURE 9), the spring clip wire is rotated so that its cavity dwelling end is positioned longitudinally of the farthest cavity end 93. If the hanger bracket 57 tends to rotate so as to unseat the holding pin 57a, it is free to do so because the wire 95 can move into the deep end 93 of the cavity. However, winding rotation of the drum results in counter-clockwise rotation of the flywheel 51 (FIGURE 9) and a raising of the end of the spring clip wire 95 so that its end abuts the short end 92. Thus, a rapid rotational deceleration of the drum when winding up the belt 28 cannot cause the second spur gear to climb around the periphery of the first gear and lock the drum, because the wire 95, now is in an abutting position with the cavity end 92, preventing the counter-clockwise rotation of the hanger bracket 57.

Figure 10:
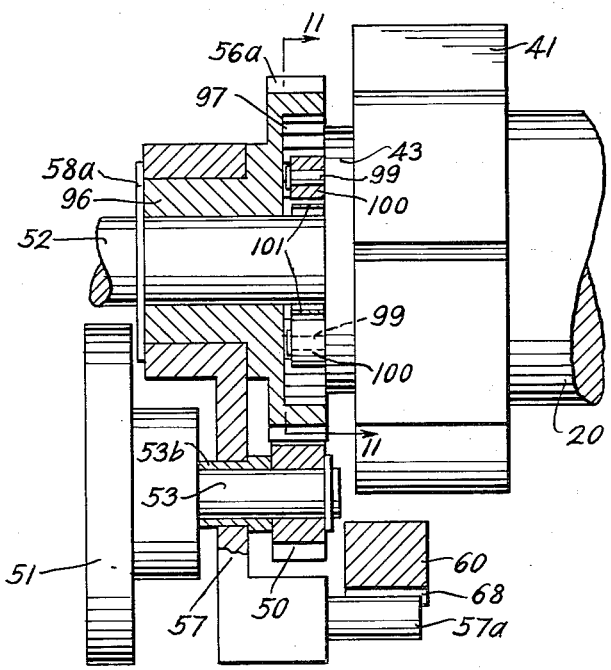
FIGURE 10 is a view, similar to that of FIGURE 8 incorporating another anti-locking modification; and, FIGURE 11 is a view along line 11—11 of FIGURE 10.
Figure 11:
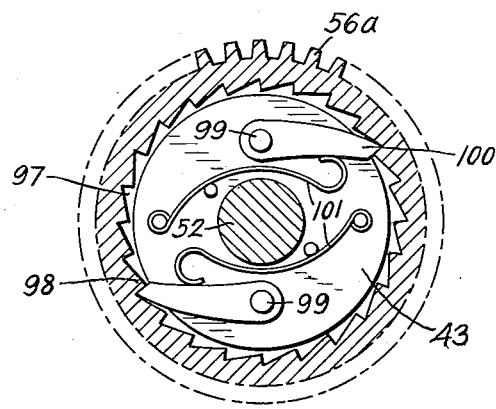

Another modification to provide an anti-locking arrangement which functions generally in the manner of that of FIGURE 9 is shown in FIGURES 10 and 11 where the same parts are identified by the same reference numerals. The spur gear 56a is mounted on the second reduced diameter extension 52 of the drum 20 to be supported thereby for free relative rotation. The gear 56a is provided with a hub 96 having a step of reduced diameter supporting pendulum-like hanger bracket 57 in like manner for relative rotation with respect to hub 96. The hanger bracket 57 and spur gear 56a are maintained in position on shaft 52 by a press-fit washer 58a. The gear 56a has an internal cavity 97 therein opening toward the first axial extension 43 of the drum 20. A wall of the cavity 97 is provided with a plurality of ratchet teeth 98. One or more pivot pins 99 are attached to the end of the axial extension 43 to extend into cavity 97. A pawl 100 is mounted for pivotal movement on pivot pin 99 and biased into ratcheting engagement with teeth 98 by means of a spring 101.

The ratchet teeth 98 and pawl 100 provide a one-way or unidirectional ratchet arrangement adapted to be engaged when drum 20 is rotated in a direction to pay off flexible member 28 (clockwise in FIGURE 11) and cause inertia member 51 to be rotated. When drum 20 is rotated in a direction to wind-up flexible member 28 (counter-clockwise), the pawl ratchets over teeth 98 without imparting motion to the inertia member 51. Since inertia member 51 remains stationary during wind-up of member 28, no inertia is stored up therein which otherwise would trip the automatic locking of drum 20 on sudden deceleration of member 28 and prevent further pay out thereof unless the reel were subsequently unlocked manually. It will be appreciated that other one way drive arrangements for gear 56a may be used and the arrangement of FIGURES 10 and 11 are illustrative only and not intended to be limiting. By the use of a greater or lesser number of ratchet teeth in the cavity of gear 56a the response time for the lock up function can be made very short. Further, the use of a plurality of pawls increases the certainty of engagement of gear 56a on pay off.

Having thus described the several useful and novel features of the inertia reel mechanism of the present invention in connection with the accompanying drawings, it will be seen that the many worthwhile objectives for which it was designed have been achieved. Although but a few of the several possible embodiments of the invention have been illustrated and described herein, I realize that certain additional modifications may well occur to those skilled in the art within the broad teaching thereof; hence, it is my intention that the scope of protection afforded hereby shall be limited only insofar as said limitations are expressly set forth in the appended claims.

As will be obviously to those skilled in the art, different operating parameters of the inertia mechanism can be achieved by varying the mass of the inertia flywheel and the diameter ratio of the first and second spur gears and the shape of the detent 68 which seats the holding pin 57a.

What is claimed is:

1. In an inertia actuated safety locking device for controlling the payed out length of reeled up personnel safety harness, the combination comprising a mountable housing, a flexible connector extending from said housing and adapted to engage a safety harness, resilient reel means connected to said flexible member and rotatably carried within said housing for normally maintaining a light tension on said flexible connector while permitting same to yield, whereby the harness is allowed freedom of motion, an inertia member within said housing turnably mounted and pivotally supported with respect to said reel means, coupling means for unidirectionally coupling said inertia member to said reel means for rotation therewith in one direction only, locking means in said housing, said inertia member being operable by inertia to cause said locking means to lock said flexible connector positively against further movement outwardly with respect to said housing when said flexible connector is pulled outwardly of said housing at a rate exceeding a predetermined acceleration.

2. The combination of claim 1 wherein the inertia member is coupled to said reel means for rotary movement under normal acceleration of said flexible connector outwardly of said housing and is adapted for pivotal movement with respect to the reel when said flexible connector is pulled outwardly at a rate exceeding a predetermined acceleration to cause said locking means to lock said flexible connector positively against further movement outwardly with respect to said housing.

3. In an inertia actuated safety locking device for controlling the payed out length of reeled up personnel safety harness, the combination comprising a mountable housing, a rotatably mounted reel mounted therein, a flexible connector wound on said reel and extending outwardly of said housing for connection to a safety harness, a yieldable resilient member coupled to said reel and tensioned so as to urge rotation of said reel in the direction to wind up the connector thereon to thereby normally maintain a light tension on said flexible member while allowing the same to yield permitting freedom of movement of the safety harness, an inertia member turnably and pivotally movable with respect to said reel, coupling means unidirectionally connecting said inertia member with said reel for rotation therewith in one direction only, locking means within said device for locking said reel against turning movement, movement of said flexible connector outwardly of said device at a rate exceeding a predetermined acceleration causing said inertia member to resist the turning of said reel to produce pivotal movement thereof and effect the locking of the reel by said locking means, thus positively preventing further outward movement of the flexible connector.

4. The combination of claim 3, wherein the locking means comprises a plurality of ratchet teeth operatively connected to the reel and rotatable therewith, and a pawl pivoted for engaging said ratchet teeth upon pivotal movement of said inertia member due to movement of said flexible connector at a rate exceeding a predetermined acceleration.

5. In an inertia actuated safety locking device for controlling the payed out length of reeled up personnel safety harness, the combination comprising; a mountable housing, a drum rotatably mounted within the housing, belt means wound upon the drum and adapted to be payed off the drum to the exterior of the housing; a ratchet wheel mounted concentrically on the drum; a first spur gear mounted on the drum for concentric relative rotation; a pivotally mounted pawl engageable with said ratchet wheel and adapted to stop its rotation in one direction, means biasing the pawl for engagement with the ratchet wheel; triggering means pivotally supported by the said drum and adapted for normally holding the pawl out of engagement with the ratchet wheel, said triggering means including, a bracket pivotally mounted on said drum, a shaft rotatably mounted in said bracket and disposed transversely to the plane thereof, a flywheel secured to one end of the shaft, a second spur gear mounted on the other end of the shaft, and pin means carried by said bracket and positioned and arranged to engage the said pawl; said second spur gear being in coplanar relation with the first spur gear and in engagement therewith and means coupling unidirectionally coupling said first spur gear to said drum for rotation therewith.

6. The combination as set forth in claim 5, and further comprising release means, said means including a manual shaft supported for rotation by the housing, an actuating finger carried by said shaft and secured thereto for rotation therewith, said finger disposed for rotation in the plane of the said bracket and positioned for contact therewith; and manually operable rotating means attached to one end of said manual shaft, whereby the manual shaft may be rotated and the actuating finger can act to release the said pawl from locking engagement with the ratchet wheel.

7. The inertia mechanism of claim 6, and further including dog means for also engaging and locking the ratchet wheel, said dog means being in coplanar relation with the ratchet wheel and mounted on the said manual shaft for rotation therewith.

8. The combination of claim 6, and further comprising power means attached to said drum and mounted in the housing for rotating the drum to wind up the belt.

9. An automatic locking device for preventing the rotational movement of a rotatable body comprising in combination a rotatable body; ratchet means mounted on said rotatable body and rotatable therewith; a first spur gear mounted concentric with and relatively rotatable with the ratchet means; pivotally mounted locking means positioned for engagement with the ratchet means; holding means normally holding said locking means out of engagement with the ratchet means, said holding means including, a pivotally mounted hanger bracket having its pivotal axis common to the axis of rotation of the ratchet means, a shaft journalled for rotation and carried by the hanger bracket, the said shaft being parallel to the said axis of rotation of the hanger bracket, an inertia flywheel secured to one end of the shaft, a second spur gear secured to the other end of the shaft, said second spur gear disposed in coplanar relation to the first spur gear and engaged therewith, latch means mounted on the hanger bracket and engageable with the locking means and coupling means unidirectionally coupling said first spur gear to said ratchet means for rotation therewith.

10. The locking device as described in claim 9 and further including a biasing spring abutting the locking means and urging the locking means into engagement with the ratchet means.

11. The combination of claim 10, and further comprising a rotatably mounted support pin carrying the biasing spring, whereby rotation of the said pin moves the spring relative to the said locking means.

12. The locking device of claim 9 and further comprising a manually rotatable shaft disposed parallel to the axis of rotation of the rotatable body; and a locking dog secured to the manually rotatable shaft and engageable with the ratchet means.

13. The apparatus as set forth in claim 12 and further including reset means mounted on the manually rotatable shaft and positioned to be engageable with the hanger bracket so as to abut and rotate the hanger bracket about its pivotal center.

14. A safety locking device according to claim 1 wherein the coupling means comprises a one-way ratchet and pawl arrangement with one of said ratchet and said pawl being operatively connected to said reel means and the other being operatively connected to said inertia member and said coupling means being adapted to drive the inertia member on rotation of the reel means in one direction and to ratchet in the other.

15. The safety locking device of claim 5 wherein the coupling means comprises a one-way ratchet teeth and pawl arrangement with one of said ratchet teeth and said pawl being operatively connected to said drum means and the other to said first spur gear and said coupling means being adapted to drive said first spur gear on rotation of the drum means in one direction and to ratchet in the other.

16. The locking device according to claim 9 wherein the coupling means comprises a one-way ratchet teeth and pawl arrangement with one of said ratchet teeth and said pawl being operatively connected to said rotatable body and the other to said first spur gear and said coupling means being adapted to drive said first spur gear on rotation of said rotatable body in one direction and to ratchet in the other.

References Cited in the file of this patent
UNITED STATES PATENTS

| | | |
|---|---|---|
| 1,239,758 | Baker | Sept. 11, 1917 |
| 1,273,539 | Rinsche | July 23, 1918 |
| 2,845,233 | Pfankuch et al. | July 29, 1958 |
| 2,953,315 | Lautier et al. | Sept. 20, 1960 |
| 2,992,790 | Cushman et al. | July 18, 1961 |